(12) United States Patent
Mahley, III (10) Patent No.: US 11,918,956 B2
(45) Date of Patent: Mar. 5, 2024

(54) MEMBRANE MODULE

(71) Applicant: Schlumberger Technology Corporation, Sugar Land, TX (US)

(72) Inventor: George E. Mahley, III, Berkeley, CA (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 17/756,522

(22) PCT Filed: Dec. 16, 2020

(86) PCT No.: PCT/US2020/065210
§ 371 (c)(1),
(2) Date: May 26, 2022

(87) PCT Pub. No.: WO2021/126908
PCT Pub. Date: Jun. 24, 2021

(65) Prior Publication Data
US 2022/0395781 A1 Dec. 15, 2022

Related U.S. Application Data

(60) Provisional application No. 62/948,491, filed on Dec. 16, 2019.

(51) Int. Cl.
*B01D 53/22* (2006.01)
*B01D 63/02* (2006.01)
*B01D 63/04* (2006.01)

(52) U.S. Cl.
CPC ......... *B01D 63/0241* (2022.08); *B01D 53/22* (2013.01); *B01D 63/04* (2013.01);
(Continued)

(58) Field of Classification Search
CPC .. B01D 2315/24; B01D 63/024; B01D 63/04; B01D 53/22; B01D 2313/21; B01D 2053/224
See application file for complete search history.

(56) References Cited

U.S. PATENT DOCUMENTS

| 5,071,552 | A | * | 12/1991 | Bikson | ................. | B01D 63/025 |
| | | | | | | 210/321.89 |
| 6,814,780 | B2 | * | 11/2004 | Bikson | ................. | B01D 53/268 |
| | | | | | | 95/55 |
| 9,186,629 | B2 | | 11/2015 | Mahley, III | | |

(Continued)

FOREIGN PATENT DOCUMENTS

| CA | 2994035 C | 4/2023 |
| CN | 109847466 A | 6/2019 |

(Continued)

OTHER PUBLICATIONS

International Search Report and Written Opinion issued in the PCT Application PCT/US2020/065210, dated Mar. 30, 2021 (9 pages).

*Primary Examiner* — Anthony R Shumate
(74) *Attorney, Agent, or Firm* — Matthew Goode (57) ABSTRACT

A membrane assembly includes a tube container having an inlet conduit and a first outlet conduit both oriented in a radial direction, and a second outlet conduit oriented in an axial direction; and a hollow fiber membrane element disposed inside the tube container, the hollow first membrane element comprising a first adapter with an axial permeate fluid passage in a center thereof and an inlet gas passage in a peripheral portion thereof; and a second adapter with an axial permeate fluid passage in a center thereof and a non-permeate fluid passage in a peripheral portion thereof.

17 Claims, 4 Drawing Sheets

(52) U.S. Cl.
CPC .... *B01D 2053/224* (2013.01); *B01D 2313/21* (2013.01); *B01D 2315/24* (2022.08)

(56) References Cited

U.S. PATENT DOCUMENTS

| | | | | |
|---|---|---|---|---|
| 9,731,230 | B2 * | 8/2017 | Freeman | B01F 23/2312 |
| 9,962,629 | B2 | 5/2018 | Taylor et al. | |
| 2002/0162451 | A1 | 11/2002 | Bikson et al. | |
| 2002/0162455 | A1 * | 11/2002 | Bikson | B01D 53/22 |
| | | | | 96/8 |
| 2006/0124529 | A1 | 6/2006 | Schott et al. | |
| 2007/0284108 | A1 * | 12/2007 | Roes | B32B 15/013 |
| | | | | 166/302 |
| 2008/0149555 | A1 * | 6/2008 | Schwartz | B01D 63/12 |
| | | | | 210/321.72 |
| 2009/0071652 | A1 * | 3/2009 | Vinegar | E21B 43/2401 |
| | | | | 166/303 |
| 2009/0189617 | A1 * | 7/2009 | Burns | E21B 43/24 |
| | | | | 324/649 |
| 2013/0327219 | A1 | 12/2013 | Taylor et al. | |
| 2016/0023164 | A1 * | 1/2016 | Karode | B01D 53/227 |
| | | | | 29/401.1 |
| 2017/0113181 | A1 | 4/2017 | Sinstedten et al. | |
| 2017/0128888 | A1 | 5/2017 | Karode et al. | |
| 2018/0221824 | A1 | 8/2018 | Visser et al. | |
| 2019/0169050 | A1 | 6/2019 | Crouch et al. | |

FOREIGN PATENT DOCUMENTS

| | | | | |
|---|---|---|---|---|
| EP | 1374974 | A2 * | 1/2004 | B01D 53/22 |
| WO | WO-9964758 | A1 * | 12/1999 | B60T 11/16 |
| WO | WO-0062909 | A1 * | 10/2000 | B01D 29/012 |
| WO | WO-2004020072 | A1 * | 3/2004 | B01D 29/15 |
| WO | 2006062791 | A2 | 6/2006 | |
| WO | 2016209755 | A1 | 12/2016 | |

* cited by examiner

MEMBRANE MODULE

CROSS-REFERENCE TO RELATED APPLICATION

The present document is based on and claims priority to U.S. Provisional Application Ser. No. 62/948,491, filed Dec. 16, 2019, which is incorporated herein by reference in its entirety.

FIELD

Embodiments of the present invention generally relate to a membrane module. Specifically, a membrane module for counter-flow gas separation in a tube is disclosed.

BACKGROUND

Membrane filtration is commonly used to separate gases. A membrane filter element is disposed inside a housing, and gases that permeate the filter element flow to one outlet while those gases that do not permeate the filter element flow to another outlet. The housing is typically designed for one type of filter element, with inlet and outlet flows optimized to interact with the filter element inside the housing. For example, flat sheet spiral wound filter elements work by flowing high pressure gas in a radial direction of the housing and then axially through the filter element with a low pressure permeate stream directed into a central axial tube, while hollow fiber filter elements work by flowing high pressure gas in an axial or radial direction of the housing then axially or radially through the filter element with the low pressure permeate gas flowing from a tube sheet into a chamber and out of the housing, and one of the high pressure streams flowing through a central axial tube. Generally, such filter elements are not interchangeable in a single housing. Flexible membrane filter designs would be helpful.

SUMMARY

Embodiments described herein provide a membrane assembly that includes a tube container having an inlet conduit and a first outlet conduit both oriented in a radial direction, and a second outlet conduit oriented in an axial direction; and a hollow fiber membrane element disposed inside the tube container, the hollow fiber membrane element comprising a first adapter with a centrally disposed axial permeate fluid passage and a peripherally disposed inlet gas passage; a second adapter with a centrally disposed axial permeate fluid passage and a peripherally disposed non-permeate fluid passage; and a plurality of hollow fibers disposed between the first adapter and the second adapter, each hollow fiber having a first end engaged with the first adapter and a second end opposite from the first end, wherein the second end of each fiber is sealed.

Other embodiments described herein provide a membrane assembly, comprising a tube container having an inlet conduit and a first outlet conduit both oriented in a radial direction, and a second outlet conduit oriented in an axial direction; and a plurality of hollow fiber membrane elements disposed inside the tube container in a serial arrangement, each hollow fiber membrane element comprising a central conduit; a first adapter coupled to a first end of the central conduit, the first adapter having an axial permeate fluid passage in a center thereof and an inlet gas passage in a peripheral portion thereof; a second adapter coupled to a second end of the central conduit opposite from the first end, the second adapter having an axial permeate fluid passage in a center thereof and a non-permeate fluid passage in a peripheral portion thereof; and a plurality of hollow fibers disposed between the first adapter and the second adapter in a volume around the central conduit, each hollow fiber having a first end engaged with the first adapter and a second end opposite from the first end, wherein the second end of each fiber is sealed, wherein the second adapter of one hollow fiber membrane element is connected to the first adapter of another hollow fiber membrane element to form a continuous central passage through all the hollow fiber membrane elements.

Other embodiments described herein provide a method of arranging a filter assembly, comprising arranging a plurality of hollow fibers, each fiber sealed at a first end thereof, in a volume of a cylindrical filter element around a central conduit and feed sleeve thereof; engaging the feed sleeve with the central conduit to define an annular space between the feed sleeve and the central conduit; providing a fluid passage from the annular space to the volume; collecting penetrant fluid from the unsealed ends of the fibers into the central conduit at a penetrant fluid end of the filter assembly; and flowing non-penetrant fluid to a non-penetrant fluid end of the filter assembly

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
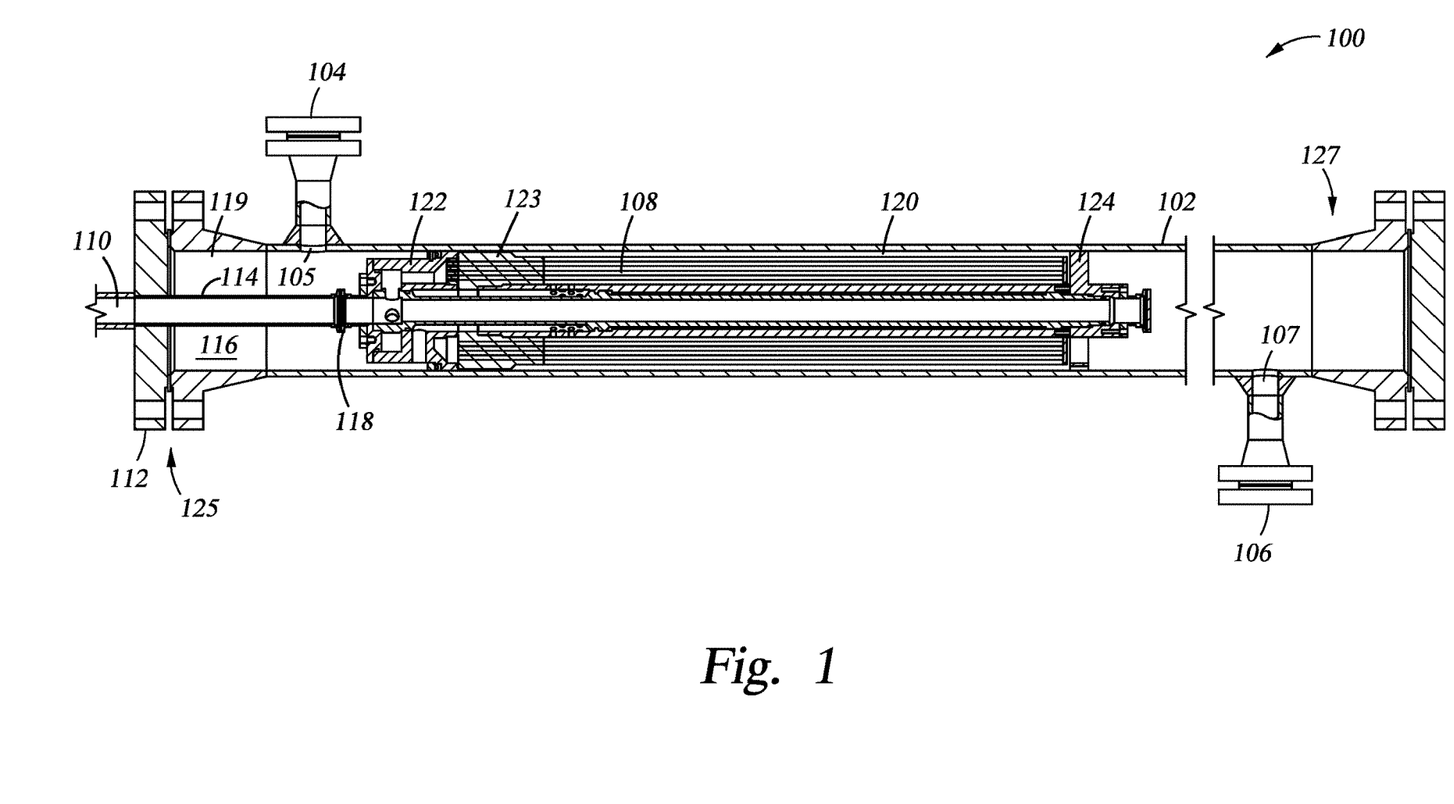
FIG. 1 is a cross-sectional view of a membrane module according to one embodiment.

FIG. 1 is a cross-sectional view of a membrane assembly 100 according to one embodiment. The membrane assembly 100 has a tube container 102 with an inlet conduit 104 attached to a sidewall thereof at an inlet port 105. A first outlet conduit 106 is also attached to the sidewall at a first outlet port 107. The inlet conduit 104 and first outlet conduit 106 are spaced apart in an axial direction of the membrane assembly 100 to allow for gas flow through a membrane module 108, further described below. The inlet conduit 104 and first outlet conduit 106 are oriented in a radial direction of the tube container 102.

The tube container 102 also has a second outlet port 110 at a first end 112 of the tube container 102, with a second outlet conduit 114 extending into an interior 116 of the tube container to fluidly couple to the membrane module 108 at an end 118 of the second outlet conduit 114. The second outlet conduit 114 here has an inner diameter substantially the same as an inner diameter of the second outlet port 110 and an outer diameter less than an inner diameter of the tube container 102. The tube container 102 and the second outlet conduit 114 thus define an inlet plenum 119 that fluidly communicates with the inlet conduit 104 through the inlet port 105. In this case, the inlet port 105 is located closer to the first end 112 than the end 118 of the second outlet conduit 114.

The membrane assembly 100 has a permeate end 125 and a non-permeate end 127, opposite from the permeate end 125. The inlet conduit 104 is located between the permeate end 125 and the non-permeate end 127. The first outlet conduit 106 is located at the non-permeate end 127, and the second outlet conduit 114 is located at the permeate end 125. The second outlet conduit 114 is configured within the tube container 102 such that permeate fluid flows to the central axis of the membrane assembly 100 into the second outlet conduit 114. This enables multiple membranes to be arranged in series inside a single tube container 102, if desired.

The membrane module 108 comprises a membrane element 120, a first adapter 122, and a second adapter 124. The first and second adapters 122 and 124 couple the membrane element 120 into the tube container 102 and direct gas flow through the membrane element 120 to perform a separation process. The membrane element 120 here is a hollow fiber membrane element, but it should be noted that the tube container 102 here can also be used with spiral-wound flat sheet type membrane elements. The first adapter 122 is located toward the permeate end 125 of the membrane assembly 100, and the second adapter 124 is located toward the non-permeate end 127 of the membrane assembly 100. Providing a membrane assembly design such as the membrane assembly 100 enables the flexibility to use hollow fiber filter elements with a tube container that can also accommodate spiral-wound flat sheet type membrane elements. With such flexibility, the type of membrane element can be changed to accommodate changing process conditions, if needed.

Gas generally flow through the inlet conduit 104, through an entry conduit of the first adapter 122 and is introduced to the membrane element 120 from the center of the membrane element 120. The fibers of the membrane element 120 are individually sealed at the end of the membrane element 120 near the second adapter 124. The fibers are coupled to the adapter 122 by a tube sheet member 123. Gas introduced to the membrane element 120 flows toward the second adapter 124, and some gas permeates the membrane fibers. Gas that penetrates into the hollow fibers flows through the tube sheet member 123 into the second outlet port 110. Gas that does not permeate into the fibers flows toward the second adapter 124 and through the openings thereof.

Figure 2:
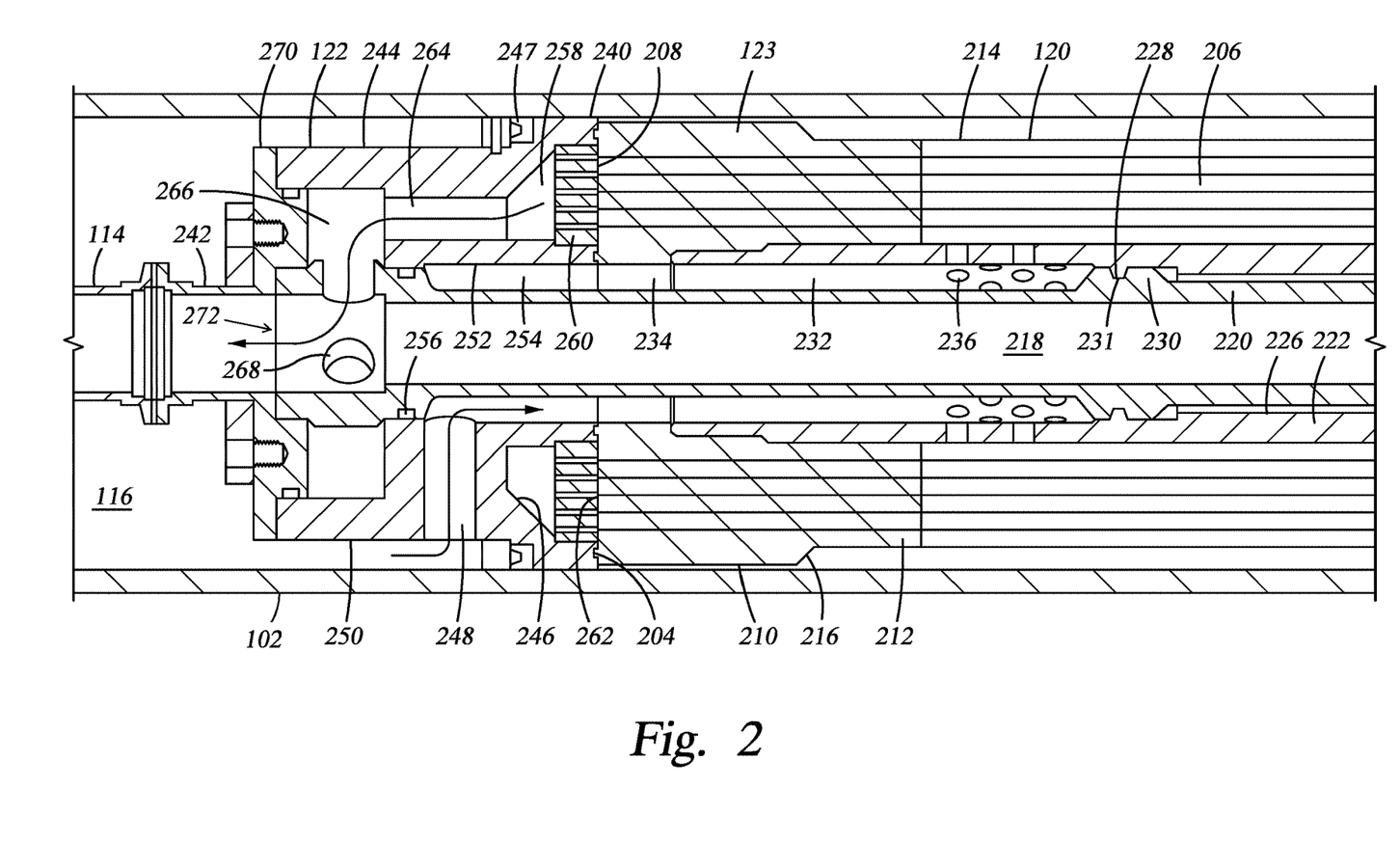
FIG. 2 is a close-up view of a portion of the cross-section of FIG. 1.

FIG. 2 is a close-up view of a portion of the cross-section of FIG. 1. The tube sheet member 123 is located at a first end 204 of the membrane element 120, and a filter member 206 is mated to the tube sheet member 123. The first adapter 122 engages with the tube sheet member 123 at an interface surface 208 thereof. The tube sheet member 123 has a first section 210 and a second section 212. The first section 210 has a first outer diameter and the second section 212 has a second outer diameter, where the first outer diameter is greater than the second outer diameter. The first section 210 includes the interface surface 208, and interfaces with the second section 212 at an interface 216. The second section 212 engages with the filter member 206. The second outer diameter is substantially the same as an outer diameter of the filter member 206. A baffle member 214, made of a material that is substantially impermeable to gases encountered by the membrane element 120, surrounds the filter member 206 and the second section 212 of the tube sheet member 123, mating the two members together. Here, the baffle member 214 extends along the second section 212 to the interface 216, which in this case is a linearly tapered surface, but could be a convex or concave rounded surface, or even an untampered surface, that extends radially inward from the first section 210 to the second section 212. The baffle member 214 may extend along the filter member 206 most or all the length of the filter member 206 to the second adapter 124 (FIG. 1), or the baffle member 214 may extend a short distance around the filter member 206 to cover the junction between the fibers of the filter member 206 and the tube sheet member 123. The baffle member 214 functions, at least in part, to prevent expansion of the fibers of the filter member 206 as fluid penetrates the fibers. In some cases, the baffle member 214, or a portion thereof, may extend over portions of the filter member 214 as well as portions of the second section 212. In other cases, the baffle member 214 may extend into the tube sheet member 123 such that the second section 212 of the tube sheet member 123 overlaps a portion of the baffle member 214.

The baffle member 214 may be a jacket disposed around the filter member 206 and the second section 212 of the tube sheet member 123. The baffle member 214 may be a metal cylinder. In some cases, the baffle member 214 may have a first part and a second part. In such cases, the first part may be a flexible member, such as a flexible fabric jacket or plastic sheet, fit snugly around the filter member 206 and the second section 212. The second part can then be a metal cylinder disposed around the first part. The second part can alternately be a fiberglass-epoxy composite flexible wrap that cures to form hard shell.

The membrane element 120 is configured as a hollow cylinder with a central passage 218 that accommodates a central conduit 220. The central conduit 220 permits gas flow along a central axis of the membrane assembly 100. A sleeve 222 lines the central passage 218. The sleeve 222 has an inner diameter generally greater than an outer diameter of the central conduit 220, thus defining an annular space between the sleeve 222 and an outer wall 226 of the central conduit 220. The sleeve 222 has a seal portion 228 that mates with a seal ridge 230 the projects radially outward from the outer wall 226 of the central conduit 220. The seal portion 228 may be an integral part of the sleeve 222, or a location of the sleeve 222 where a seal member is positioned to mate with the seal ridge 230. The seal ridge 230 is located adjacent to the filter member 206, spaced apart from the second section 212. The seal ridge 230 has a groove 231, and seal portion 228 engages with the groove 231 to form a seal that prevents gas passage through the seal within the sleeve 222.

An annular distribution passage 232 is defined by the sleeve 222 and the outer wall 226 of the central conduit 220 from an opening 234 of the sleeve 222, located adjacent to the first section 210 of the tube sheet member 123, to the seal portion 228 (and seal ridge 230). A plurality of openings 236 are provided through the sleeve 222 to allow fluid communication from the annular distribution passage 232 into the filter member 206 disposed around the outside of the sleeve 222. Gas introduced through the inlet conduit 104 into the interior 116 of the tube container 102 flows into the sleeve 222 and through the openings 236 to contact the membrane element 120. The tube sheet prevents gas flow in the interior 116 of the tube container 102 toward the first adapter 122, and provides a flow pathway for permeate fluid that enters the fibers of the filter member 206 to flow into the first adapter 122.

The first adapter 122 has an interface portion 240 that interfaces with the tube sheet member 123 at the interface surface 208. The first adapter 122 also has an outlet coupling portion 242 that fluidly couples to the second outlet conduit 114 of the tube container 102. The outlet coupling portion 242 is substantially the same size as the second outlet conduit 114. Between the outlet coupling portion 242 and the interface portion 240, the first adapter 122 has a gas flow portion 244 that routes inlet and outlet gases to and from the membrane element 120. The interface portion 240 has an outer diameter substantially the same as the inner diameter of the tube container 102 to provide sealing between the inlet side of the interior 116 and the membrane element 120. The gas flow portion 244 has an outer diameter that is smaller than the outer diameter of the interface portion 240. A tapered portion 246 of the first adapter 122 extends radially inward from the interface portion 240 to the gas flow portion 244. A seal member 247 is located between the tapered portion 246 and the tube container 102 to enhance sealing between the inlet side of the interior 116 and the membrane element 120.

The gas flow portion 244 of the first adapter 122 has an inlet conduit 248 oriented in a radial direction from an outer surface 250 of the first adapter 122 to an inner surface 252 of the first adapter 122. The first adapter 122 has an inner diameter, at the inner surface 252, that is greater than the outer diameter of the central conduit 220, such that the first adapter 122 and the central conduit 220 form an annular feed passage 254 along the outer wall 226 of the central conduit 220 to the opening 234 of the annular distribution passage 232 of the sleeve 222. The inlet conduit 248 is located at an inlet seal ridge 256 extending radially outward from the outer wall 226 of the central conduit 220. The inlet seal ridge 256 mates with the inner surface 252 of the first adapter 122 to prevent feed gases escaping from the annular feed passage 254.

The first adapter 122 provides a continuous fluid passage from the inlet conduit 104 (FIG. 1) to the inlet conduit 248, to the annular feed passage 254, to the annular distribution passage 232, through the openings 236 in the sleeve 222, to the filter member 206. Gases that can permeate the material of the filter member 206 and the tube sheet member 123 flow to the interface surface 208 of the first adapter 122 in a first axial direction of the membrane module 108. Gases that do not permeate the material of the filter member 206 flow in a second axial direction of the membrane module 108 opposite from the first axial direction.

Inside the first adapter 122 is a permeate fluid plenum 258 that collects permeate fluid from the interface surface 208 through one or more permeate passages 260 formed through a permeate surface 262 of the first adapter 122 that engages with the interface surface 208 of the tube sheet member 123. A permeate fluid passage 264 is disposed within the first adapter 122 extending in an axial direction thereof to an outlet plenum 266 of the first adapter 122. The outlet plenum 266 provides fluid communication to an inlet port 268 of the central conduit 220. The inlet seal ridge 256 is located between the annular feed passage 254, which is outside the central conduit 220, and the inlet port 268 of the central conduit 220. The first adapter 122 thus also provides a continuous fluid passage from the interface surface 208 of the tube sheet member 123 to the permeate fluid plenum 258, to the permeate fluid passage 264 through the first adapter 122, to the outlet plenum 266 of the first adapter 122, to the inlet port 268 of the central conduit to the outlet coupling portion 242 of the first adapter 122, to the second outlet conduit 114 of the tube container 102.

The membrane element 120 and first adapter 122 thus function together to provide a flow of inlet gas from the inlet conduit 104 to the inlet conduit 248 of the first adapter 122, into the annular distribution passage 232 of the sleeve 222, through the openings 236 to the filter member 206. Gas that can permeate the material of the filter member 206 and the tube sheet member 123 flows into the permeate fluid plenum 258, through the permeate fluid passage 264 and into the central conduit 220 to exit through the second outlet conduit 114 of the membrane assembly 100.

The first adapter 122 is capped by a seal disk 270, which seals the outlet plenum 266 by mating with the first gas flow portion 244 and with a permeate end 272 of the central conduit 220. The outlet coupling portion 242 attaches to the seal disk 270. The first adapter 122 thus has an axial permeate fluid passage at a center thereof and an inlet gas flow passage in a peripheral portion thereof. The inlet gas flow passage of the first adapter 122 generally flows the inlet gas in a direction opposite to a flow direction of permeate fluid through the first adapter 122.

Figure 3:
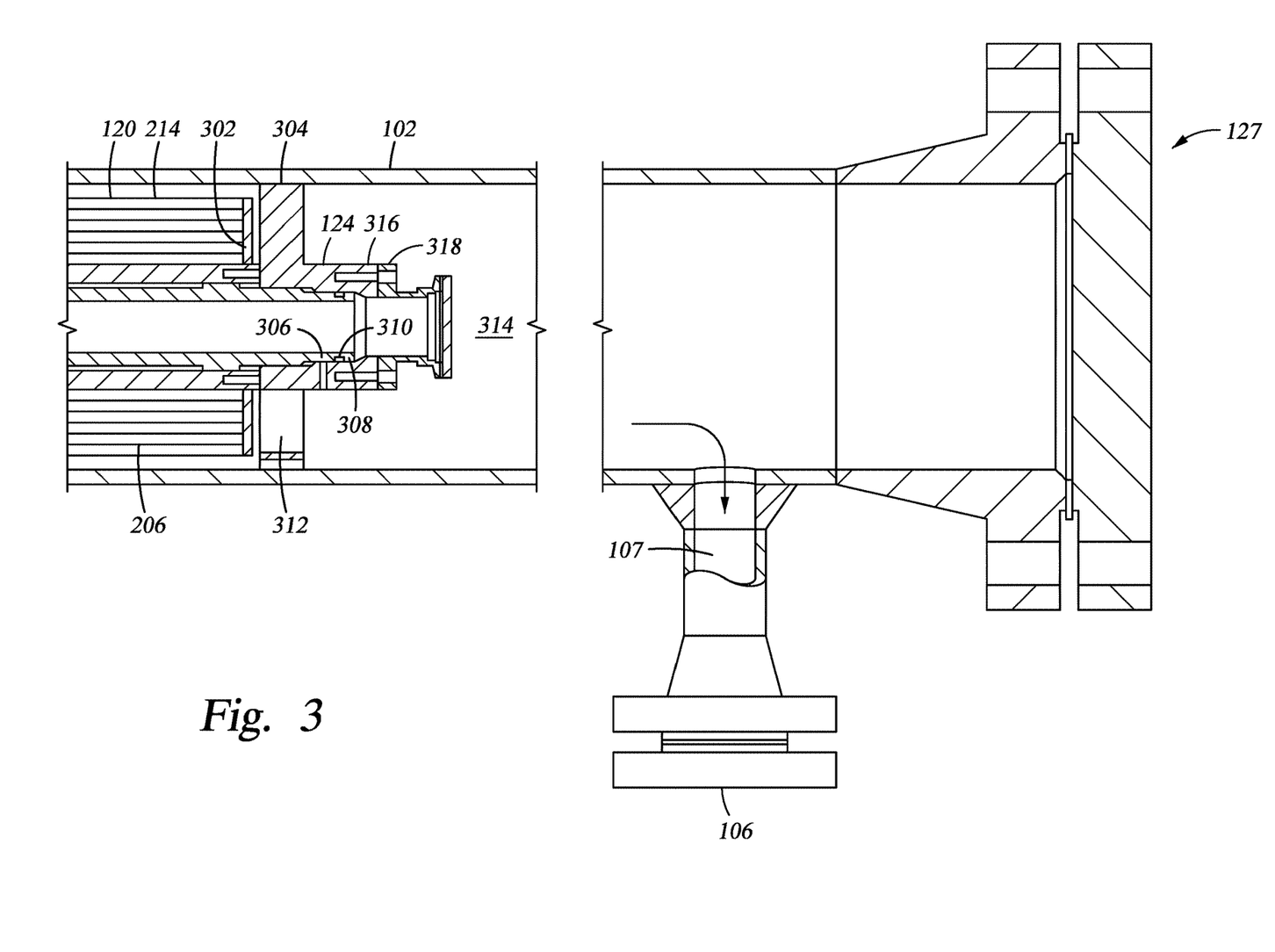
FIG. 3 is a close-up view of another portion of the cross-section of FIG. 1.

FIG. 3 is a close-up view of another portion of the cross-section of FIG. 1. In FIG. 3, the non-permeate end 127 of the membrane assembly 100 is shown, with the second adapter 124. In this case, the baffle member 214 of the membrane element 120 ends at an opening 302 that allows non-permeate fluids to exit the filter member 206 at the non-permeate end 127 of the membrane assembly 100. The baffle member 214 also functions, in part, to direct flow of non-penetrant fluid toward the non-penetrant end of the membrane module 108. The penetrant and non-penetrant fluids thus counterflow within the membrane module 108, optimizing composition-driven fluid penetration rate along the fibers.

The second adapter 124 has a first portion 304 that engages the inner surface of the tube container 102. An outer radius of the first portion 304 is substantially the same as the inner radius of the tube container 102 in this case, but the outer radius of the first portion 304 can be less than the inner radius of the tube container 102. The second adapter 124 has an inner surface 306 that engages with the central conduit 220 at a non-permeate end 308 thereof. Here, the second adapter 124 fits around the non-permeate end 308 of the central conduit 220. A seal member 310 may be disposed between the inner surface 306 and the central conduit 220 to control flow of non-permeate fluids. The second adapter 124 has one or more outlet openings 312 formed through the first portion 304 to allow non-permeate fluids to flow from the filter member 206 to a non-permeate fluid plenum 314 that fluidly communicates with the first outlet conduit 106 via the first outlet port 107.

The second adapter 124 has a second portion 316 that includes a permeate fluid connector 318. The permeate fluid connector 318, which may be identical to the outlet coupling portion 242 (FIG. 2), provides a fluid coupling to the central conduit 220 that is similar to, and can engage with, the outlet coupling portion 242 of another first adapter 122 coupled with another membrane element 120. In this way, a second membrane element identical to the membrane element 120 can be disposed in the tube container 102 and fluidly coupled to the membrane element 120 in series such that the permeate fluid from both membrane elements 120 can be combined and flowed to the second outlet conduit 114. The non-permeate fluid from one membrane element 120 flows into the inlet conduit 248 of the second membrane element, and flows through the second membrane element to the non-permeate end thereof. In this way, all the non-permeate fluids from the membrane elements 120 are combined to flow into the first outlet conduit 106 of the tube container 102.

The second adapter 124 thus has an axial permeate fluid passage at a center thereof and a non-permeate fluid passage in a peripheral portion thereof.

It should be noted that radially oriented conduits and passages described herein can have axial inclination in either direction, as convenient, and could also have azimuthal inclination in any direction without substantially affecting performance of the membrane assembly 100. Since the radially oriented conduits and passages described herein generally terminate at gas plenums or other gas passages, any axial flow or tangential flow imparted by such inclinations will not affect downstream performance.

Figure 4:
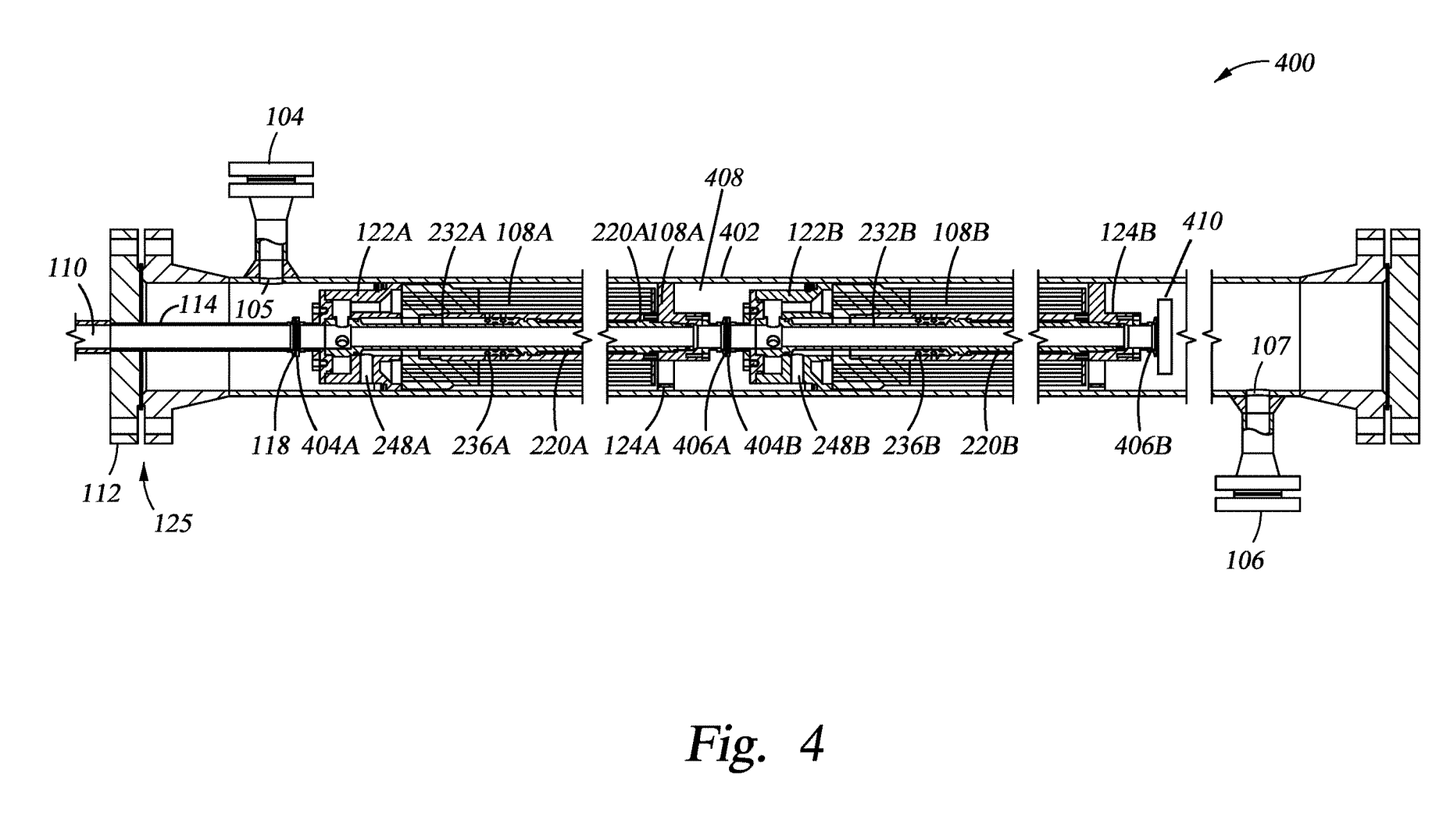
FIG. 4 is a cross-sectional view of a membrane assembly according to another embodiment.

An advantage of the configuration of the filter membranes described herein is shown in FIG. 4. FIG. 4 is a cross-sectional view of a membrane assembly 400 according to another embodiment. The membrane assembly 400 has a plurality of the membrane modules 108 arranged serially and axially within a tube container 402. In this case, the tube container 402 has a length selected to accommodate a plurality of the membrane modules 108 in an axially serial arrangement. Here, two of the membrane module 108 are shown in the tube container 402. The tube container 402 has the inlet conduit 104 and the inlet port 105, oriented in a radial direction as above, and the first outlet port 107 and first outlet conduit 106 also oriented in a radial direction as above. The tube container 402 also has the second outlet port 110 and second outlet conduit 114 at the first end 112 of the tube container 402.

In this case, a first membrane module 108A is connected to a second membrane module 108B. The first membrane module 108A has a first adapter 122A, which is identical to the first adapter 122 of FIG. 1, and a second adapter 124A, which is identical to the second adapter 124 of FIG. 1. The second membrane module 108B also has a first adapter 122B, which is identical to the first adapter 122 of FIG. 1, and a second adapter 1246, which is identical to the first adapter 124 of FIG. 1. Here, the first adapter 122B of the second membrane module 108B is attached to the second adapter 124A of the first membrane module 108A. The first and second membrane modules 108A and 108B have respective a central conduits 220A and 220B extending from end to end of each membrane module. The respective first and second adapters 122A, 124A, 122B, and 124B fit around the end of the central conduits 220A and 220B. The first adapters 122A and 122B have respective ends 404A and 404B. The second adapters 124A and 124B also have respective ends 406A and 406B. The ends of the adapters 122A, 124A, 122B, and 124B all have conduits that fluidly couple to the central conduits 220A and 220B of the membrane modules 108A and 108B to provide a continuous fluid pathway from the end 404A of the first adapter 122A to the end 406B of the second adapter 124B.

As described above, the membrane modules 108A and 108B are configured so fluid that penetrates the hollow fibers of the membrane modules flows into the central conduits 220A and 220B, respectively. Here, the end 404B of the first adapter 122B of the second membrane module 108B is connected to the end 406A of the second adapter 124A of the first membrane module 108A to form a continuous central pathway extending the length of the two membrane modules 108A and 108B. Penetrant fluid can thus flow from the central conduit 220B of the second membrane module 108B to the central conduit 220A of the first membrane module 108A. The end 404A of the first adapter 122A is connected to the end 118 of the second outlet conduit 114 of the tube container 402. Thus, penetrant fluid from the two membrane modules 108A and 108B can flow to the second outlet port 110. The connections between the two membrane modules 108A and 108B may be flanged connections, as shown here, or may be any other type of connection, such as quick-connect or quick-seal connections.

As noted above, non-penetrant fluid flows toward the second adapter 124 of each membrane module 108. In the first membrane module 108A, non-penetrant fluid flow toward the second adapter 124A of the first membrane module 108A and exits the first membrane module 108A through the openings of the second adapter 124A into a plenum 408 between the first membrane module 108A and the second membrane module 108B. The end 406A of the second adapter 124A of the first membrane module 108A protrudes in an axial direction, while the end 404B of the first adapter 122B of the second membrane module 108B also protrudes to meet the end 406A. The plenum 408 is defined between the second adapter 124A of the first membrane module 108A and the first adapter 122B of the second membrane module 108B. Non-pentrant gas exiting the first membrane module 108A flows into the inlet conduit 248B of the first adapter 122B of the second membrane module 108B, through the annular distribution passage 232B of the second membrane module 108B, through the openings 236B in the sleeve to contact the fibers of the second membrane module 108B.

Remaining fluid that can penetrate the fibers of the second membrane module 108B flows back toward the first adapter 122B of the second membrane module 108B, as described above, and remaining non-penetrant fluid flows toward the second adapter 124B of the second membrane module, exiting the tube container 402 at the first outlet port 107.

Any number of membrane modules, configured in this way, can be serially connected within a tubular container configured, as shown and described herein, with radial inlet and outlet ports and conduits. Penetrant fluid flows into the central conduits, through the membrane modules to emerge at the second outlet 110, while non-penetrant fluids are routed through the fiber members of each membrane module, emerging from the second adapter 124 of the last membrane module.

Whether one or many membrane modules are used, the end 406 of the second adapter 124 of the last membrane module must be closed so that penetrant fluid flows toward the second outlet 110. The end 406 can be plugged or blanked, or in some cases instruments or other functional members can be connected at the end of the last membrane module. In FIG. 4, a relief valve 410 is connected at the end 406B of the second adapter 124B of the second membrane module 108B. In cases where use of such membrane modules builds significant pressure drop and the membrane modules may be operating near their maximum specified pressure, a relief valve 410 connected at the non-penetrant end of the membrane modules, or series thereof, can prevent the low pressure regions of the assembly from having pressure greater than the high pressure regions of the assembly. As noted above, the only real limit to the number of membrane modules that can be connected in series as shown in FIG. 4 are the flow limits imposed by the inlet and outlet ports 105 and 107 and differential pressure limits between the ports 105 and 107.

The membrane structures shown herein illustrate a method of arranging a filter assembly that offers modular scaling to accommodate process filtration needs. The filter assembly so arranged uses a cylindrical filter element with hollow filter fibers sealed at a first end and coupled to a tube sheet at a second end opposite from the first end. The cylindrical filter element has a central conduit with a feed sleeve disposed around the central conduit to form an annular space. The feed sleeve has holes to allow process fluid from the annular space to come into contact with the filter fibers. Process fluid flow is configured to enter the annular space around the central conduit of the filter element and flow into contact with the filter fibers.

Penetrant fluid penetrates the fibers and flows away from the seal ends of the fibers and toward the tube sheet. The penetrant fluid flows through the tube sheet and is collected and routed into the central conduit, or another conduit connected to the central conduit. For example, an adapter with a central conduit can be used to collect the penetrant fluid into the central conduit of the adapter and then routed out of the filter element.

Non-penetrant fluid remains external to the fibers and flows away from the tube sheet. The non-penetrant fluid exits the filter element at the non-penetrant end and can be removed from the filter assembly or routed to the feed sleeve of a subsequent filter element.

In such filter assemblies, process fluid feed enters the filter assembly at a location offset from the central conduit that carries penetrant fluid out of the filter assembly. The process fluid is routed into the annular space of the feed sleeve to come into contact with the fibers of the filter element. This can be done using the same adapter that collects penetrant fluid from the tube sheet of the filter element. In this way, non-penetrant fluid is generally routed toward a non-penetrant end of the filter assembly along a generally annular flow path around the central conduit, while penetrant fluid is routed toward a penetrant end of the filter assembly within the central conduit. Such arrangement allows for connecting multiple filter elements serially to provide any scaled filtration capacity. In such assemblies, the central conduits of a plurality of such filter elements are connected to provide a continuous central passage for flow of penetrant fluids through all the filter elements to the penetrant fluid end of the assembly while non-penetrant fluid flows in a generally annular path around the continuous central passage to the non-penetrant end of the assembly.

It should be noted that filter elements arranged in this way could have different fiber members to accomplish different types of filtering or provide different filtering efficiency. So long as the fiber members provide an internal flow pathway for penetrant fluid, the fibers can be any material to perform any desired type of filtration.

While the foregoing is directed to embodiments of the present invention, other and further embodiments of the present disclosure may be devised without departing from the basic scope thereof, and the scope thereof is determined by the claims that follow.

What is claimed is:

1. A membrane assembly, comprising:
   a tube container having an inlet conduit and a first outlet conduit both oriented in a radial direction, and a second outlet conduit oriented in an axial direction; and
   a hollow fiber membrane element disposed inside the tube container, the hollow fiber membrane element comprising:
   a first adapter with a centrally disposed axial permeate fluid passage and a peripherally disposed inlet gas passage;
   a second adapter with a centrally disposed axial permeate fluid passage and a peripherally disposed non-permeate fluid passage; and
   a plurality of hollow fibers disposed between the first adapter and the second adapter, each hollow fiber having a first end engaged with the first adapter and a second end opposite from the first end, wherein the second end of each fiber is sealed.

2. The membrane assembly of claim 1, wherein the hollow fiber membrane element has a central conduit with a sleeve, the hollow fibers are disposed in a volume around the central conduit and the sleeve, the sleeve and the central conduit define an annular space between the sleeve and the central conduit, and the central conduit or the sleeve has openings that fluidly connect the annular space with the volume.

3. The membrane assembly of claim 2, wherein the inlet gas passage of the first adapter fluidly communicates with the annular space.

4. The membrane assembly of claim 3, wherein the first adapter has a permeate conduit that fluidly connects the first end of each hollow fiber to the permeate fluid passage.

5. The membrane assembly of claim 4, wherein the first adapter has a plenum within the first adapter and fluidly connected to the permeate conduit.

6. The membrane assembly of claim 5, wherein the first adapter has two plenums within the first adapter and fluidly connected to the permeate conduit.

7. The membrane assembly of claim 6, wherein the fibers are coupled to the first adapter by a tube sheet.

8. The membrane assembly of claim 7, wherein the sleeve forms a seal with the central conduit and the openings are between the seal and the tube sheet.

9. The membrane assembly of claim 1, wherein the hollow fiber membrane element further comprises a baffle member disposed around the hollow fibers.

10. A membrane assembly, comprising:
    a tube container having an inlet conduit and a first outlet conduit both oriented in a radial direction, and a second outlet conduit oriented in an axial direction; and
    a plurality of hollow fiber membrane elements disposed inside the tube container in a serial arrangement, each hollow fiber membrane element comprising:
    a central conduit;
    a first adapter coupled to a first end of the central conduit, the first adapter having an axial permeate fluid passage in a center of the first adapter and an inlet gas passage in a peripheral portion of the first adapter;
    a second adapter coupled to a second end of the central conduit opposite from the first end, the second adapter having an axial permeate fluid passage in a center of the second adapter and a non-permeate fluid passage in a peripheral portion of the second adapter; and
    a plurality of hollow fibers disposed between the first adapter and the second adapter in a volume around the central conduit, each hollow fiber having a first end engaged with the first adapter and a second end opposite from the first end, wherein the second end of each fiber is sealed,
    wherein the second adapter of one hollow fiber membrane element is connected to the first adapter of another hollow fiber membrane element to form a continuous central passage through all the hollow fiber membrane elements.

11. The membrane assembly of claim 10, wherein each hollow fiber membrane element further comprises a sleeve engaged with the central conduit to define an annular space between the sleeve and the central conduit, and the central conduit or the sleeve has openings that fluidly connect the annular space with the volume.

12. The membrane assembly of claim 11, wherein the inlet gas passage of the first adapter of each hollow fiber membrane element fluidly communicates with the annular space.

13. The membrane assembly of claim 12, wherein the first adapter of each hollow fiber membrane element has a permeate conduit that fluidly connects the first end of each hollow fiber to the permeate fluid passage of the first adapter.

14. The membrane assembly of claim 13, wherein adjacent hollow fiber membrane elements define a plenum therebetween, the plenum providing fluid passage for non-permeate fluid from one hollow fiber membrane element to the inlet conduit in the first adapter of the adjacent hollow fiber membrane element.

15. The membrane assembly of claim 14, wherein each hollow fiber membrane element comprises a tube sheet that couples the fibers to the first adapter.

16. The membrane assembly of claim 15, wherein the sleeve of each hollow fiber membrane element forms a seal with the central conduit and the openings are between the seal and the tube sheet.

17. The membrane assembly of claim 16, further comprising a relief valve fluidly coupled to the continuous central passage of the hollow fiber membrane elements.

* * * * *